United States Patent [19]

Richter

[11] 4,351,154
[45] Sep. 28, 1982

[54] FEED OF THE EXHAUST GASES FROM AN INTERNAL-COMBUSTION ENGINE TO THE ROTOR OF A CENTRIPETAL TURBINE OF AN EXHAUST GAS TURBOCHARGER

[75] Inventor: Helmuth Richter, Celle-Boge, Fed. Rep. of Germany

[73] Assignee: Aktiengesellschaft Mühnle, Kopp & Kausch, Frankenthal, Fed. Rep. of Germany

[21] Appl. No.: 92,642

[22] Filed: Nov. 8, 1979

[30] Foreign Application Priority Data

Nov. 17, 1978 [DE] Fed. Rep. of Germany ....... 2849924

[51] Int. Cl.³ .......................... F02B 37/00; F01D 9/04
[52] U.S. Cl. ...................................... 60/605; 415/205
[58] Field of Search ................ 60/602, 605, 597, 598; 415/184, 205

[56] References Cited

U.S. PATENT DOCUMENTS

| 3,383,092 | 5/1968 | Cazier | 60/605 X |
|---|---|---|---|
| 3,664,761 | 5/1972 | Zastrow | 415/205 |
| 3,930,747 | 1/1976 | Woollenweber | 60/605 X |
| 4,027,994 | 6/1977 | MacInnes | 415/205 X |
| 4,111,598 | 9/1978 | Kasuya | 60/605 X |

FOREIGN PATENT DOCUMENTS

| 1949484 | 11/1966 | Fed. Rep. of Germany | 415/205 |
|---|---|---|---|
| 2230718 | 1/1974 | Fed. Rep. of Germany | 415/205 |
| 2653505 | 5/1977 | Fed. Rep. of Germany | 415/205 |

*Primary Examiner*—Michael Koczo, Jr.
*Attorney, Agent, or Firm*—Herbert L. Lerner

[57] ABSTRACT

Feed for exhaust gases from a multicylinder internal-combustion engine to a rotor of a centripetal turbine of an exhaust gas turbocharger, the turbine having a housing formed with three adjacent outlets radially leading to the rotor, including a line system connecting the engine to the turbine housing and including a first exhaust gas line connected to substantially half of the cylinders of the engine, and a second exhaust gas line connected to the other half substantially of the cylinders of the engine, the first exhaust gas line being connected to the middle outlet of the three adjacent outlets, and the second exhaust gas line being connected by respective branch lines to the two outer outlets of the three adjacent outlets.

4 Claims, 8 Drawing Figures

FEED OF THE EXHAUST GASES FROM AN INTERNAL-COMBUSTION ENGINE TO THE ROTOR OF A CENTRIPETAL TURBINE OF AN EXHAUST GAS TURBOCHARGER

The invention relates to the feed of exhaust gases from an internal-combustion engine to the rotor of a centripetal turbine of an exhaust gas turbocharger having a manifold or line system connecting the turbine housing to the engine, the turbine housing having three outlets leading radially toward the rotor.

The turbines of exhaust gas turbochargers operate to convert, to the greatest extent possible, pressure energy, velocity energy and thermal energy contained in the exhaust gas of the engine into torque at the turbine shaft, in order to compress the charging air of the engine by means of a radial compressor wheel provided on the same shaft. To this end, two exhaust gas lines are often brought from the cylinders of the engine to the spiral housing of the turbine, one group of cylinders, respectively, always being connected to an exhaust gas line in accordance with the firing sequence of the engine. To utilize the energy contained in the exhaust gas optimally, each of the two exhaust gas flows should be conducted to the inlet of the turbine wheel with as little influence as possible being exerted thereon by the other. This should primarily avoid backfiring of the exhaust gas flow of either exhaust gas line, which arrives at the turbine and pulsates in dependence upon the opening times of the exhaust valves, into the other of the exhaust gas lines when no appreciable gas flow is flowing in the other exhaust gas line at the same time. The exhaust gas pulses should strike the turbine blades with full kinetic energy and, therefore, they must not encounter a large connected-line volume.

Two basically different attempts for solving the problem of maintaining separation of the exhaust gas flows up to the inlet of the turbine wheel have become known heretofore:

From German Published Nonprosecuted Application DE-OS No. 2 653 505, a twin-flow housing is known, wherein the spiral turbine housing is divided by a partition, which ends at a distance from the turbine wheel inlet, into a first exhaust gas line and a second exhaust gas line. The exhaust gas pulse coming alternatingly from the first and the second exhaust gas line, respectively, impacts the entire width of the turbine wheel inlet and has a respective axial component; the axial components of the exhaust gas pulses of the first and second exhaust gas line, respectively, have the same magnitude, but different direction.

From German Published Nonprosecuted Application DE-OS No. 2 230 718, a dual-flow housing is known, wherein the exhaust gas flows coming from the two exhaust lines, respectively, act upon the entire width of the turbine wheel inlet but, respectively, only over half the periphery of the turbine wheel.

Neither solution is satisfactory, however.

In the case of the twin-flow housing, cylical variations of the axial thrust are produced by the alternating manner in which the turbine wheel inlet is acted upon from different directions, which can cause instability of the lubricating oil film and consequent failure of the axial shaft bearing. Furthermore, the axial directional components of the exhaust gas flows do not contribute to driving the rotor and are therefore lost insofar as the balance of energy is concerned.

In the case of the dual-flow housing, the effects of the pulsating flow impinging upon half the rotor periphery are even less favorable. In this case, damage can occur at the directly affected radial bearings and by excitation of blade vibrations.

Starting from a twin-flow housing, it is an object of the invention to provide an exhaust-gas feed of the foregoing general type which avoids cyclic variations of the axial thrust and reduces the axial directional components of the exhaust gas flows entering the rotor and thereby, to improve the efficiency of such a feed.

With the foregoing and other objects in view, there is provided, in accordance with the invention, a feed for exhaust gases from a multicylinder internal-combustion engine to a rotor of a centripetal turbine of an exhaust gas turbocharger, the turbine having a housing formed with three adjacent outlets radially leading to the rotor, including a line system connecting the engine to the turbine housing and including a first exhaust gas line connected to substantially half of the cylinders of the engine, and a second exhaust gas line connected to the other half substantially of the cylinders of the engine, the first exhaust gas line being connected to the middle outlet of the three adjacent outlets, and the second exhaust gas line being connected by respective branch lines to the two outer outlets of the three adjacent outlets.

German Utility Model No. 1 949 484 discloses a housing of an exhaust gas turbocharger with three outlets facing towards the rotor. While such an exhaust gas turbocharger may have some features in common with the exhaust gas turbocharger according to the invention, it differs basically in that three exhaust gas lines coming from the cylinders of the internal-combustion engine are coordinated or associated with the three outlets of the housing. In the embodiment of the invention, on the other hand, only two exhaust gas lines are provided, of which one exhaust gas line is connected to the two outer outlets of the turbine housing. In the operation of an exhaust gas turbo charger equipped with such a housing, exhaust pulses are applied, on the one hand, simultaneously from the two outer outlets and, on the other hand, from the middle outlet alternatingly to or against the periphery of the rotor, so that no cyclic variations of the axial thrust can occur, and the lubrication problems described at the introduction hereto are avoided.

In addition, the exhaust gas pulses hitting the periphery of the rotor from the central outlet have no axial-direction component; such axial-direction components exist only in the exhaust gas flows which come from the two outer outlets of the housing acted upon by the same exhaust gas flow, and impact the periphery of the turbine rotor. Due to the simultaneous inflow to the turbine wheel from the two outer outlets, the axial-direction components counteract each other, thereby contributing to the stabilization of the flow and effecting an inflow to the turbine wheel similar to the middle outlet. Overall, the axial-direction components of the exhaust gas flows are thus reduced, which results in an improvein efficiency.

In accordance with another feature of the invention and for aerodynamic reasons, the cross-section variations and the division of the second exhaust gas line into two branch or partial lines occur or are located advantageously in the region between the inlet of the turbine housing and the start of the spiral part of the turbine housing.

The subdivision or transition of the one exhaust gas line into two branch or partial lines is provided within the line system connecting the cylinders of the engine to the turbine housing. It is advantageous, however, to bring these two exhaust gas lines up to the turbine housing. Furthermore, in accordance with an added feature of the invention, the turbine housing has two inlets having a dimension in axial direction of the exhaust gas turbocharger which is greater than in a direction perpendicular to the axial direction i.e. in radial direction, one of the inlets being connected to the first exhaust gas line and being located at the outside of the turbine housing, the second exhaust gas line branching into the branch lines thereof within the turbine housing. Such a construction has the advantage that the housing can be interchanged with conventional housings and that the manufacturer of the exhaust gas turbocharger per se can combine, in the housing of the exhaust gas turbocharger, all measures or features which are necessary for dividing the one exhaust gas line into two partial or branch lines and for feeding the then three exhaust gas flows to the three outlets of the turbine housing.

The transition from the two inlets of the turbine housing to the three outlets to the rotor inlet is effected within the turbine housing, in accordance with a concomitant feature of the invention, by providing the first exhaust gas line with a flow cross section decreasing in axial dimension with increasing distance thereof from the inlet of the turbine housing, and increasing in radial dimension with increasing distance thereof from the inlets so as to assume a generally triangular cross section, and the second exhaust gas line has a flow cross section in the middle thereof, whereat the radial dimension of the cross section of the first exhaust gas line increases, which reduces to a constriction with increasing distance from the inlets of the turbine housing, so as to form the two branch lines.

Other features which are considered as characteristic for the invention are set forth in the appended claims.

Although the invention is illustrated and described herein as embodied in a feed of the exhaust gases from an internal-combustion engine to the rotor of a centripetal turbine of an exhaust gas turbocharger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
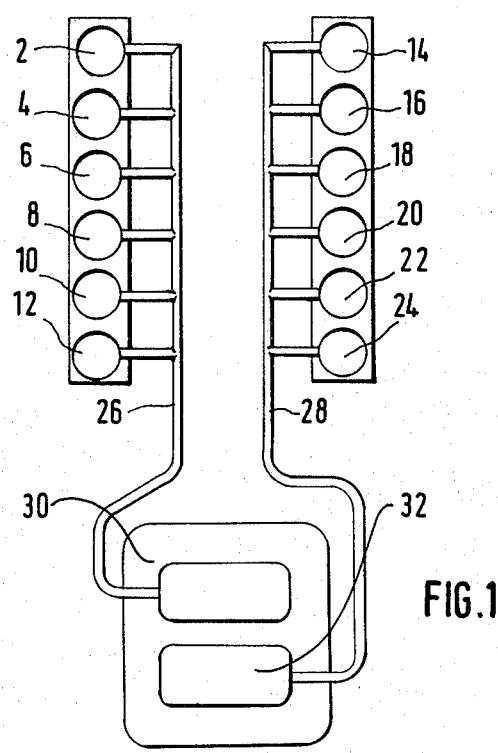
FIG. 1 is a diagrammatic view of the cylinders of an internal-combustion engine coordinated with the two inlets of a turbine housing.

Referring now to the drawing and first, particularly, to FIG. 1 thereof, there are shown diagrammatically cylinders 2, 4, 6, 8, 10, 12, 14, 16, 18, 20, 22 and 24 of an internal combustion engine. The cylinders 2, 4, 6, 8, 10 and 12 are connected to a first exhaust gas line 26, and the cylinders 14, 16, 18, 20, 22 and 24 to a second exhaust gas line 28.

Figure 2:
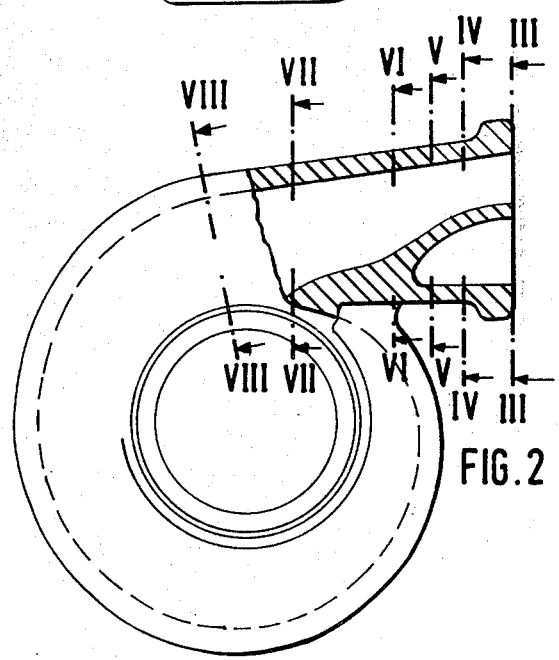
FIG. 2 is an axial view, partly in section, of the turbine housing, the sectional plane being the symmetry plane of FIGS. 4 to 8.

In FIG. 2, the partly sectioned turbine housing is shown as viewed in axial direction.

Figure 3:
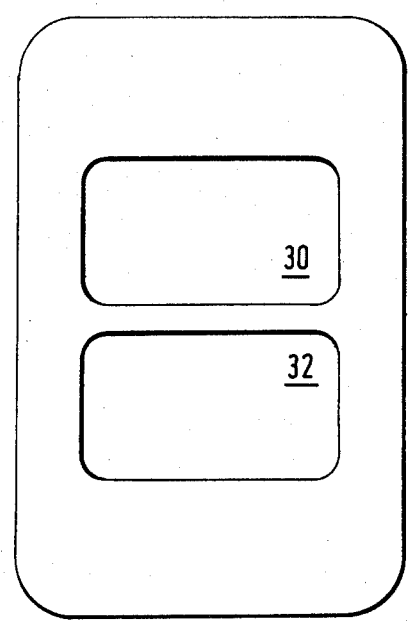
FIG. 3 is an elevational view of the turbine housing at the inlet end thereof located in the vertical plane III—III in FIG. 2, and FIGS. 4 to 8 are cross-sectional views of FIG. 2 taken along the lines IV—IV to VIII—VIII, respectively, in direction of the arrows.

FIG. 3 is an elevational view of the inlet connection tube or union of the turbine housing in the plane III—III of FIG. 2 showing the two housing inlets 30 and 32.

Figure 4:
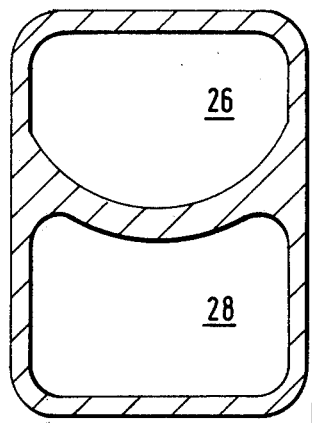

From the cross-sectional view of FIG. 4 taken along the line IV—IV in FIG. 2, it is apparent that in the illustrated cross-sectional plane of the inlet union of the turbine housing, the first exhaust gas line 26 has become enlarged somewhat in radial direction while the second exhaust gas line 28 has become smaller correspondingly.

Figure 5:
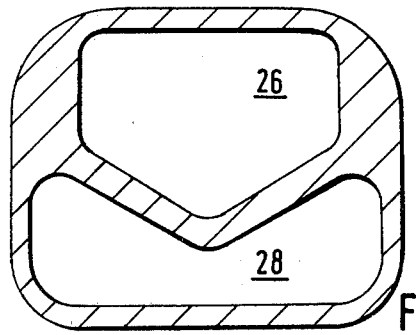

In the following cross-sectional plane taken along the line V—V in FIG. 2 and shown in FIG. 5, further radial enlargement of the first exhaust gas line 26 has occurred at the expense of the second exhaust gas line 28; on the other hand, the axial extent or dimension of the first exhaust gas line 26 has decreased and the radial dimension of the second exhaust gas line 28 has increased to the right and left-hand sides, as shown in FIG. 5, so that the second exhaust gas line 28 is formed with wings at the right-hand and left-hand sides thereof, as viewed in FIG. 5, which tend to envelop or extend around the first exhaust gas line 26.

Figure 6:
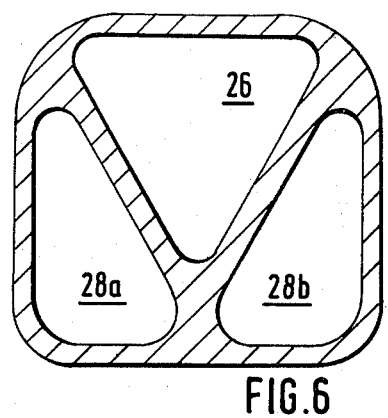

According to FIG. 6, which is a cross-sectional view of FIG. 2 taken along the line VI—VI in direction of the arrows, the first exhaust gas line 26 has assumed a cross-sectional shape of a triangle with acute angles whereas the second exhaust gas line 28 has gone over or branched into two separate lines 28a and 28b.

Figure 7:
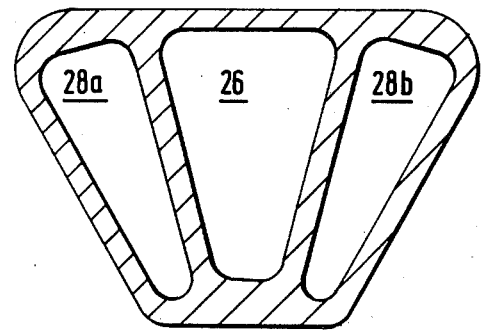

FIG. 7 shows a cross-sectional view of FIG. 2 taken along the line VII—VII in direction of the arrows, the cross-sectional plane being immediately forward of the outlet of the turbine housing in direction toward the rotor inlet. It is readily apparent that, at the cross-sectional plane viewed in FIG. 7, the three lines 26, 28a and 28b have respective radial dimensions that are almost equal.

Figure 8:
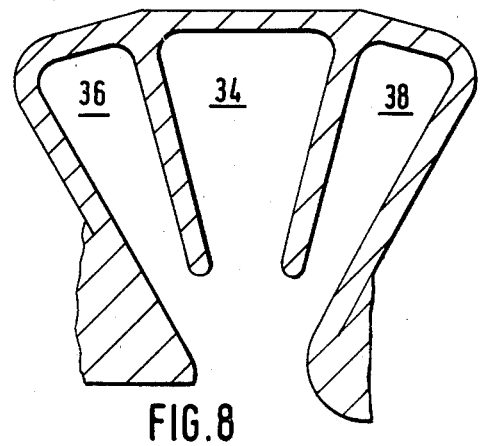

FIG. 8, which is a cross-sectional view of FIG. 2 taken along the line VIII—VIII in direction of the arrows, finally shows the outlet of the turbine housing as viewed in direction toward the non-illustrated rotor. The outlet 34 shown in the middle of FIG. 8 is associated with the first exhaust gas line 26, while the other two outlets 36 and 38 are associated with the second exhaust gas line 28 and form the mouths, respectively, of the two branching lines 28a and 28b of the second exhaust gas line 28.

There are claimed:

1. Feed for exhaust gases from multicylinder internal-combustion engine to a rotor of a centripetal turbine of an exhaust gas turbocharger, the turbine having a housing formed with three adjacent outlets radially leading to the rotor, and two inlets disposed above one another and extending in a direction perpendicular to the axis of the housing, two exhaust gas lines of the engine being connected to the two inlets, respectively, a first one of the exhaust gas lines being connected to substantially half of the cylinders of the engine, and a second one of the exhaust gas lines being connected to the other half substantially of the cylinders of the engine, comprising two branch lines branching from the second exhaust gas line; the first exhaust gas line being connected to the middle outlet of the three adjacent outlets, and said two branch lines being connected to the two outer outlets of said three adjacent outlets at the inlet to the rotor; said two branch lines and said two outlets connected thereto extending in direction of the axis of the rotor, at the inlet to the rotor, and being, respectively, disposed adjacent the first exhaust gas line and the middle outlet, respectively; said three adjacent outlets extending in common over the circumference of the rotor.

2. Feed according to claim 1 wherein said turbine housing has a spiral housing part and is formed with said two inlets, said second exhaust gas line branching into said two branch lines thereof at a location between said turbine inlet means and a beginning of said spiral housing part.

3. Feed according to claim 1 or 2 wherein said inlets have a dimension in an axial direction of the exhaust gas turbocharger which is greater than in a direction perpendicular to said axial direction i.e. in a radial direction.

4. Feed according to claim 3 wherein said first exhaust gas line has a flow cross section decreasing in axial dimension with increasing distance thereof from said inlet means of said turbine housing, and increasing in radial dimension with increasing distance thereof from said inlet means so as to assume a generally triangular cross section, and said second exhaust gas line has a flow cross section in the middle thereof, whereat said radial dimension of the cross section of said first exhaust gas line increases, which reduces to a constriction with increasing distance from said inlet means of said turbine housing, so as to form said two branch lines.

* * * * *